(12) United States Patent
Ortiz et al.

(10) Patent No.: US 8,548,499 B2
(45) Date of Patent: Oct. 1, 2013

(54) DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT

(75) Inventors: Sofia Alexandra Ortiz, Albuquerque, NM (US); Luis M. Ortiz, Albuquerque, NM (US)

(73) Assignee: Ortiz and Associates Consulting, LLC, Albuquerque, NM (US)

( * ) Notice: Subject to any disclaimer, the term of this patent is extended or adjusted under 35 U.S.C. 154(b) by 0 days.

(21) Appl. No.: 13/346,206

(22) Filed: Jan. 9, 2012

(65) Prior Publication Data

US 2012/0178476 A1  Jul. 12, 2012

Related U.S. Application Data

(60) Provisional application No. 61/431,893, filed on Jan. 12, 2011.

(51) Int. Cl.
*H04W 24/00* (2009.01)

(52) U.S. Cl.
USPC .................. 455/456.1; 455/456.5; 455/456.6; 455/436; 340/539.13

(58) Field of Classification Search
USPC ........ 455/456.1, 456.5, 456.6, 418, 436–444; 340/539.13
See application file for complete search history.

(56) References Cited

U.S. PATENT DOCUMENTS

| 2004/0123998 | A1* | 7/2004 | Berglund et al. | 174/92 |
| 2007/0072620 | A1* | 3/2007 | Levitan | 455/456.1 |
| 2007/0072623 | A1* | 3/2007 | Shyr et al. | 455/456.1 |
| 2008/0186162 | A1* | 8/2008 | Rajan et al. | 340/539.13 |
| 2008/0242312 | A1* | 10/2008 | Paulson et al. | 455/456.1 |
| 2011/0095883 | A1* | 4/2011 | Watts et al. | 340/539.11 |

* cited by examiner

*Primary Examiner* — Kamran Afshar
*Assistant Examiner* — Marisol Fahnert
(74) *Attorney, Agent, or Firm* — Ortiz & Lopez, PLLC

(57) ABSTRACT

The last known location of a lost or stolen device can be determined based on the device's last communication with a wireless data network. A portable device can be set up to communicate its location to a server after it obtains a wireless connection to a wireless data network and registers a most recent location with the server. A device can be set up to communicate its location based on at least one of communication with wireless data network hardware or portable device GPS location determined after the device obtains a wireless connection to a wireless data network. Location is stored until a subsequent location is registered in the server. The server can be programmed to send at least one of "lost" message, ringtone, lock code and wipe command to a lost or stolen portable device. The server can be programmed to provide map location information for the last known location of the lost portable device.

3 Claims, 3 Drawing Sheets

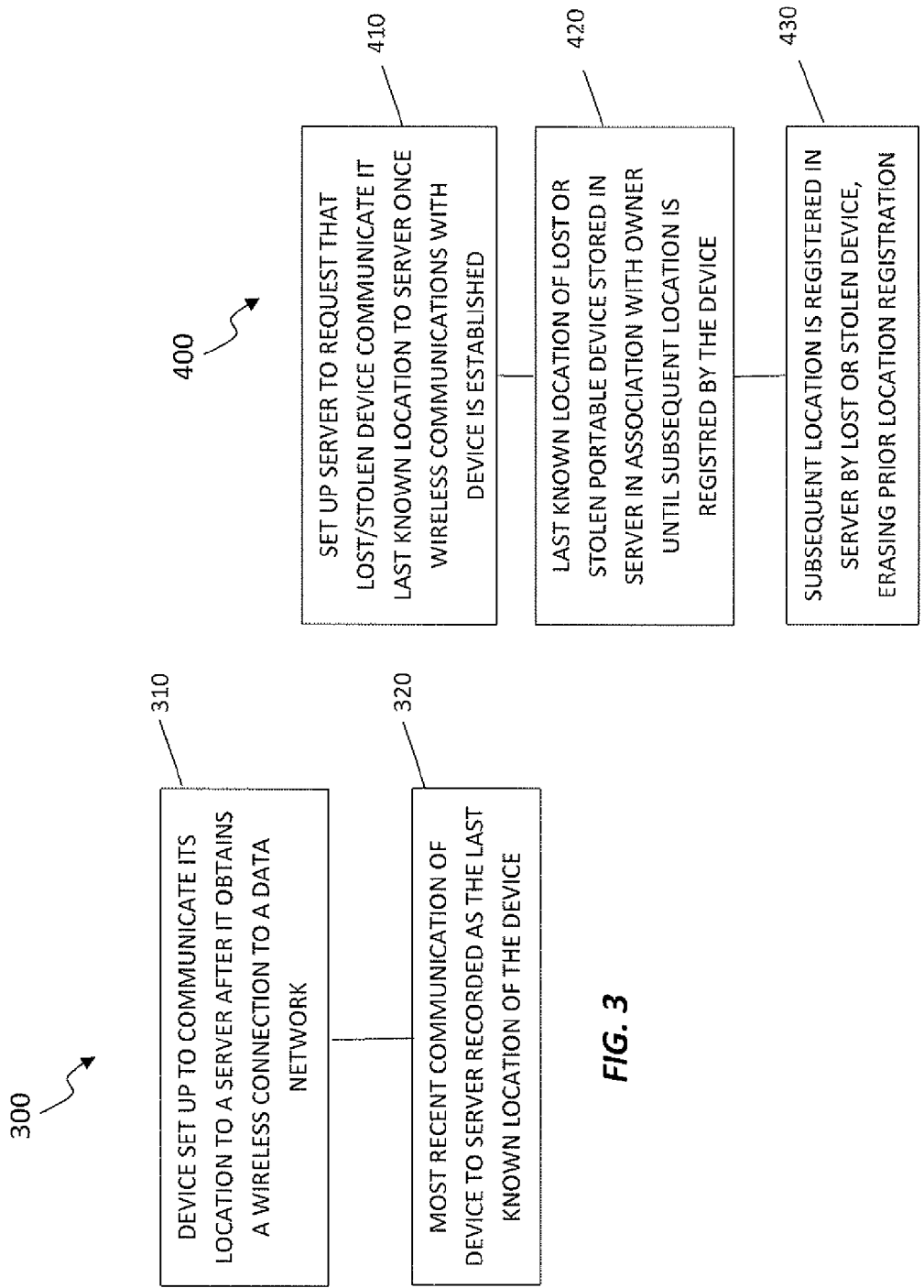

DETERMINING THE LAST LOCATION OF LOST AND STOLEN PORTABLE ELECTRONIC DEVICES WHEN WIRELESS COMMUNICATIONS ACCESS TO THE LOST OR STOLEN DEVICES IS LOST OR INTERMITTENT

INVENTION PRIORITY

This patent application claims priority as a continuation of U.S. Provisional Patent Application No. 61/431,893, filed Jan. 12, 2011, entitled "METHODS AND SYSTEMS FOR DETERMINING THE LAST LOCATION OF LOST AND STOLEN PORTABLE ELECTRONIC DEVICES WHEN THEIR WIRELESS ACCESS IS NOT CONTINUOUS USING ELECTRONIC MESSAGING SERVICES", which is incorporated herein by reference.

TECHNICAL FIELD

The present invention is generally related to systems and methods for locating lost items. The present invention is further related to systems and methods for determining the location of lost and stolen portable electronic devices. More particularly, the present invention is related to methods and systems for determining the last location lost and stolen portable electronic devices when wireless communications access to the lost or stolen devices is lost or intermittent.

BACKGROUND

Portable electronic devices such as smartphones, personal digital assistants, laptop computers, and electronic tablets have become ubiquitous in modern societies. Their use is common among most working adults as well as senior citizens and many children. Portable devices such as tablet computers and handheld computers enables user, among other things, to watch video, access the Internet, communicate with remote friends family and associates, read electronic books and listen to music. Many portable electronic devices include electronics and wireless communications that enable access to and communications through wireless data networks. The problem with the small size of, albeit great appeal to, these very useful portable electronic devices is that they can become easily lost or stolen, resulting in a substantial loss of data by and value to their owners.

Portable device tracking and locating systems and methods are offered by some companies. For example Apple Computer Corporation provides its subscribers the MobileMe™ services, which enables iPhone, iPad, iPod and iTouch users to find their lost or misplaced portable devices on a map via the Internet. The location of lost devices can be found on a map if a finding option (e.g., "Find My iPhone") is enabled in the MobileMe settings of the portable device. When this feature is enabled, a user can use any computer to sign into a secured "me.com" website account, or by using the Find My iPhone application on another iPhone, to display the approximate location of the lost device on a full-screen map. The MobileMe application also enables users to provide a message on the screen of the lost device and play a sound to help the owner or a stranger near the phone to find the device. The unique message can provide the stranger a number to call so that the device can be returned to the owner. The message will appear on the screen of the lost device even if it is locked. MobileMe also allows a sound to override the ringer volume or silent setting on the lost device so that it can be physically located.

Other features provided by the MobileMe application are the ability to set a passcode lock remotely and to remotely wipe all data from the device. A four-digit passcode lock can prevent people that have found or stolen a portable device from using it or accessing personal information from it. Remote Wipe assures that very sensitive data is permanently removed from the lost device in the event it is not feasible to recover it or it is no longer recoverable. If a displayed message doesn't result in the device being returned, remote wipe will assure the user's sensitive data does not fall into the wrong hands. Should the device be returned, data wiped, the data can be restored when connected and synchronized to a user's account with the computer.

The problem with current device location services is that they all depend on continuous data network communications with the lost devices when their location is being determined. If the Wi-Fi feature on a device is not always kept one, or the devices battery runs out on a misplaced device, the location can no longer be determined. A user may not know that their device is missing until some time has passed and the lost device is no longer in communication with a wireless network. What is needed, therefore, are systems and/or methods that enable the last known location of a lost device to be reported to the device user/owner.

SUMMARY

The present invention provides methods and systems for determining the last known location of a lost or stolen device based on the device's last communication with and reported location through a wireless data network.

In accordance with a feature of the present invention, a device can be set up to communicate its location through a wireless network (e.g., cellular, 802.11) to a server tracking its location after the device obtains a connection to a wireless data network.

In accordance with yet another feature of the present invention, a lost or misplaced device can be set up to communicate its location based on at least one of wireless data network hardware (e.g., cellular tower radio signal localization and/or registered router IP address location) or portable device GPS location provided after the device obtains a wireless connection to data network.

In accordance with another feature of the present invention, a device can be set up to communicate its location to a server after it obtains a wireless connection to a wireless data network and the location is stored until a subsequent location is registered.

In accordance with a feature of the present invention, a device can be set up to receive a "locate" command from a remote server after the device obtains a wireless connection to a data network and communicates its location to the server in response to the request.

In accordance with another feature of the present invention, a portable device can be set up to communicate its location to at least one of a server or through a server to an owner of the portable device using electronic messaging (e.g., email, SMS text messaging) after the portable device obtains a wireless connection to data network.

In accordance with another feature of the present invention, a portable device can be set up to communicate its last known location to at least one of a server or through a server to an owner of the portable device using electronic messaging (e.g., email, SMS text messaging) after the portable device obtains a wireless connection to a wireless data network.

In accordance with another feature of the present invention, a server can be programmed to request a portable device to communicate its last known location to the server or through a server to an owner of the portable device using electronic messaging (e.g., email, SMS text messaging) after the portable device obtains a wireless connection to data network and the location is stored until a subsequent location is registered.

In accordance with yet another feature of the present invention, a server can be programmed to send at least one of "lost" message, ringtone, lock code and wipe command to a lost portable device and also requests a portable device to communicate its last known location to the server or through a server to an owner of the portable device using electronic messaging (e.g., email, SMS text messaging) after the portable device obtains a wireless connection to data network and the location is stored until a subsequent location is registered.

DRAWINGS

FIG. 3 illustrates a flow diagram 200 of a method for determining the last known location of a lost or stolen device based on the lost or stolen device's last communication with a data network in accordance with features of the invention; and FIG. 4 illustrates a method for determining the last known location of a lost or stolen device based on the lost or stolen device's last communication with a data network.

DETAILED DESCRIPTION

Figure 1:
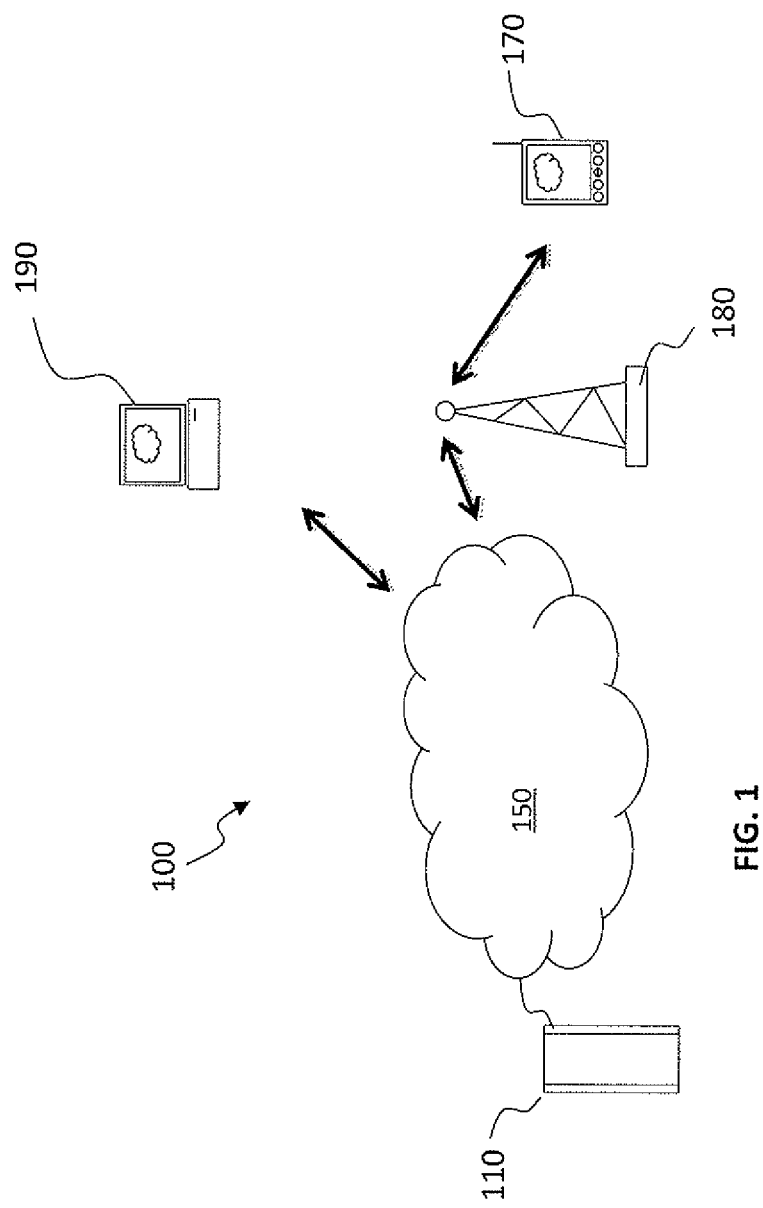
FIG. 1 illustrates a system for determining the last known location of a lost or stolen device based on the lost or stolen device's last communication with a data network.
Figure 2:
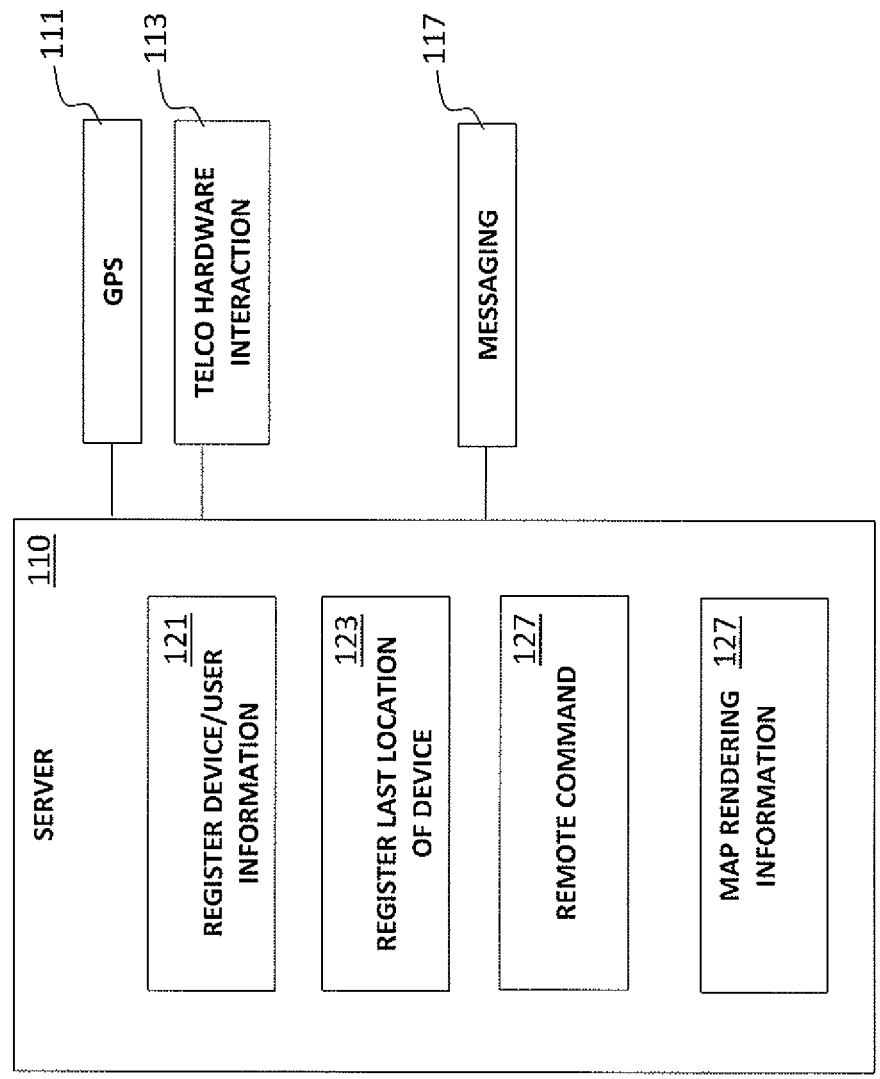
FIG. 2 illustrates a block diagram of modules for a server programmed in accordance with features of the present invention.

Referring to FIG. 1, a system 100 for determining the last known location of a lost or stolen device based on the lost or stolen device's last communication with a wireless data network is shown. The system includes a server 110 programmed to register portable devices and portable device owner information in a memory 115 and communications hardware 160 providing access to a data communications network 150. Referring to FIG. 2, the server 110 can be programmed to communicate with portable devices/user information 121 and to register the last known device location 123. Lost or stolen device location can be determined using device GPS information 111 and/or network hardware 113 information, which can include the ability to determine physical address information via cellular tower radio signal localization and/or registered hardware (e.g., physical address of equipment IP address) location after the device obtains a wireless connection to data network. Referring again to FIG. 1, portable devices 170 and can be programmed to communicate their location to a server 110 after the portable device 170 obtains a wireless connection to a data network 150 and registers a most recent communication with the server 110 that includes the last known location of the device 170.

A portable device 170 can be set up to communicate its location to a server 110 after it obtains a wireless connection to a data network 150 and register a most recent communication with the server 110 that includes the last known location of the device 170. A portable device 170 can be set up to communicate its location based on at least one of wireless data network localization assistance based on wireless device telecom hardware interaction (e.g., cellular tower signal strength and triangulation) or portable device GPS location after the device obtains a wireless connection to a data network 150. A device location is stored until a subsequent location is registered in the server 150.

Referring again to FIG. 2, the server 110 can also be programmed to providing map rendering information 127 for a remote client 190, as shown in FIG. 1, that is being used by the owner of the lost device to find the lost or stolen device. The last known location of the lost portable device 170 to be rendered on a computer generated map generated by a second client 190 based on at least one of: device GPS location, registered Wi-Fi hotspot location, registered router location, connected hardware IP address.

The server 110 can also be programmed with a remote command module 127 to send at least one of "lost" message, ringtone, lock code (e.g., four digit passcode) and memory wipe command to a lost or stolen portable device 170. Communication can be provided to/from portable devices 170 and a server over data networks including wireless data networks using wireless data communications by the portable devices 170. A portable device's last known location can be provided to user/owners on a map (based on device GPS location, registered Wi-Fi hotspot location, registered router location, IP address) or can be recorded on the server or communicated to the device owner using messaging services (e.g., email, SMS) or can be recorded on the server for the owner to retrieve when the owner/user subsequently accesses the server 110.

Referring to FIG. 3, a flow diagram 300 of a method for determining the last known location of a lost or stolen device based on the lost or stolen device's last communication with a data network in accordance with features of the invention is shown. A device can be set up to communicate its location to a server after it obtains a wireless connection to a data network, as shown in step 310. Then, as shown in step 320, the most recent communication of the device to the server is recorded in the server as the last known location of the device. A device can be set up to communicate its location based on at least one of wireless data network hardware interaction by wireless device, registered location of hardware IP address or portable device GPS location after the device obtains a wireless connection to a data network. A device can be set up to communicate its location to a server after it obtains a wireless connection to data network. A device can also be set up to communicate its location based after the device obtains a wireless connection to data network. A device can also be set up to communicate its location to a server after it obtains a wireless connection to data network and the location is stored until a subsequent location is registered in the server. A portable device can also be set up to receive a "locate" command from a remote server after the device obtains a wireless connection to a data network and communicates its location to the server in response to the request. Finally, a portable device can be set up to communicate its location to at least one of a server or through a server to an owner of the portable device using electronic messaging after the portable device obtains a wireless connection to a wireless data network.

Referring to FIG. 4, a method for determining the last known location of a lost or stolen device based on the lost or stolen device's last communication with a data network is illustrated. As shown in step 410, a server can be set up (programmed) to request that a lost or stolen portable device communicate its last known location to the server or through a server to an owner of the lost or stolen portable device using electronic messaging after the lost or stolen portable device obtains a wireless connection to a wireless data network. The last known location of the lost or stolen portable device can be stored in the server, as shown in step 420, in association with a registered owner of the lost or stolen portable device until a subsequent location is registered by the lost or stolen portable device. As shown in step 430, a subsequent location of a lost or stolen device is registered in the server, thereby erasing the previous location registered in the server. The server can also be programmed to send at least one of "lost" message, ringtone, lock code and wipe command to a lost or stolen portable device and also request the lost or stolen portable device to communicate its last known location to the server or through the server to the owner of the lost or stolen portable device using electronic messaging after the lost or stolen portable device obtains a wireless connection to the server via a wireless data network and the location is stored until a subsequent location is registered.

The invention claimed is:

1. A method for determining the last known location of a lost or stolen portable electronic device based on the lost or stolen portable electronic device's last communication with a data network, comprising:

setting up a portable electronic device from a second client communicating with a remote server monitoring the portable electronic device to receive at least one of a locate command, ringtone override command, lock code command, and wipe command initiated by a second client associated for electronic messaging communications with the portable electronic device, the second client communicating with the remote server and with the portable electronic device when the portable electronic device obtains a new wireless connection to a data network and to find the portable electronic device when the portable electronic device communicates its location to at least one of a server or through a server to the second client using electronic messaging as the location of the device changes and after the device obtains a new wireless connection to a data network;

registering a most recent communication of location information from the portable electronic device to the server as the last known location of the portable electronic device; and the portable electronic device communicates its location including map rendering information to facilitate finding a lost or stolen portable electronic device based on at least one of a wireless data network router IP address location or GPS location after the device obtains a wireless connection to a data network.

2. A method for determining the last known location of a lost or stolen portable electronic device based on the lost or stolen portable electronic device's last communication with a data network, comprising:

setting up a server from a second client to associate a lost or stolen portable electronic device with the second client and to request that the lost or stolen portable electronic device communicate its last known location to the server or through the server to the second client for an owner of the lost or stolen portable electronic device using electronic messaging S8nLt0the second client and to communicate and update of its last known location after the lost or stolen portable electronic device obtains a new wireless connection to a wireless data network;

programming the server to send at least one of lost message, ringtone, lock code and wipe command to the lost or stolen portable electronic device at the request of the second client and to provide map rendering information to the second client to facilitate finding the lost or stolen portable device; and storing the last known location of the lost or stolen portable device in the server in association with a registered owner of the lost or stolen portable electronic device until the lost or stolen portable electronic device registers a subsequent location;

wherein the device communicates its location based on at least one of a wireless data network router IP address location or GPS location after the portable electronic device obtains a wireless connection to a data network.

3. A system for determining the last known location of a lost or stolen portable electronic device based on the lost or stolen portable electronic device's last communication with a data network, comprising a server programmed to:

register portable electronic device identification and registered owner information and determine a last known location of a portable electronic device based on last communications between the portable electronic device and the server through a wireless data network;

provide memory associated with the portable electronic device and registered owner for recording the last known location of the portable electronic device;

associate a second client for communication with and control of the portable electronic device;

communicate last known location of the portable electronic device to a registered owner of the lost or stolen portable device by at least one of messaging services to the second client or via retrieval by the second client from the server of the portable electronic device identification and location data recorded in the memory for the registered owner to retrieve when the registered owner subsequently accesses the server with the second client; and provide map rendering information for the last known location of the portable electronic device to be rendered as a computer generated map on the second client based on at least one of: device GPS location, registered Wi-Fi hotspot location, registered router location. connected hardware IP address.

* * * * *

UNITED STATES PATENT AND TRADEMARK OFFICE
CERTIFICATE OF CORRECTION

| | | |
|---|---|---|
| PATENT NO. | : 8,548,499 B2 | Page 1 of 1 |
| APPLICATION NO. | : 13/346206 | |
| DATED | : October 1, 2013 | |
| INVENTOR(S) | : Sofia Alexandra Ortiz and Luis M. Ortiz | |

It is certified that error appears in the above-identified patent and that said Letters Patent is hereby corrected as shown below:

In the Claims:

Column 6, Claim 2, line 4, please delete "S8nLt0the" and insert therefore -- sent to the --.

Signed and Sealed this
Twenty-ninth Day of April, 2014

Michelle K. Lee
*Deputy Director of the United States Patent and Trademark Office*